US012559686B2

(12) United States Patent
Derks

(10) Patent No.: US 12,559,686 B2
(45) Date of Patent: Feb. 24, 2026

(54) RECOVERY OF ALIPHATIC HYDROCARBONS

(71) Applicant: SHELL OIL COMPANY, Houston, TX (US)

(72) Inventor: Willem Derks, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 453 days.

(21) Appl. No.: 17/775,700

(22) PCT Filed: Dec. 7, 2020

(86) PCT No.: PCT/EP2020/084802
§ 371 (c)(1),
(2) Date: May 10, 2022

(87) PCT Pub. No.: WO2021/115982
PCT Pub. Date: Jun. 17, 2021

(65) Prior Publication Data
US 2022/0403264 A1 Dec. 22, 2022

(30) Foreign Application Priority Data
Dec. 10, 2019 (EP) .................................... 19214797

(51) Int. Cl.
| | | |
|---|---|---|
| *C10G 1/10* | (2006.01) | |
| *B01D 9/00* | (2006.01) | |
| *C10B 53/07* | (2006.01) | |
| *C10G 1/00* | (2006.01) | |
| *C10G 55/04* | (2006.01) | |
| *C10G 73/06* | (2006.01) | |
| *C10G 73/10* | (2006.01) | |
| *C10G 73/12* | (2006.01) | |
| *C10G 73/32* | (2006.01) | |

(52) U.S. Cl.
CPC ................. *C10G 1/10* (2013.01); *B01D 9/00* (2013.01); *C10B 53/07* (2013.01); *C10G 1/002* (2013.01); *C10G 55/04* (2013.01); *C10G 73/06* (2013.01); *C10G 73/10* (2013.01); *C10G 73/12* (2013.01); *C10G 73/32* (2013.01); *B01D 2009/009* (2013.01); *C10G 2300/1003* (2013.01)

(58) Field of Classification Search
None
See application file for complete search history.

(56) References Cited

U.S. PATENT DOCUMENTS

| | | | |
|---|---|---|---|
| 2,600,184 A | 6/1952 | Arnold et al. | |
| 2,945,076 A | * 7/1960 | Pardee ..................... | C10G 9/00 |
| | | | 585/648 |
| 3,864,245 A | 2/1975 | Van Tassell | |
| 4,353,794 A | 10/1982 | Winter, III et al. | |
| 4,764,256 A | 8/1988 | Way | |
| 5,354,930 A | 10/1994 | Atkins et al. | |
| 5,399,244 A | 3/1995 | Gentry et al. | |
| 5,731,483 A | 3/1998 | Stabel et al. | |
| 8,551,328 B2 | 10/2013 | Maglio et al. | |
| 8,709,233 B2 | 4/2014 | Mccoy et al. | |
| 8,851,328 B2 | 10/2014 | Schoeley et al. | |
| 8,961,780 B1 | 2/2015 | Yusuf et al. | |
| 9,781,747 B2 | 10/2017 | Kim et al. | |
| 9,839,897 B2 | 12/2017 | Lacheen | |
| 9,856,425 B2 | 1/2018 | Ward et al. | |
| 10,767,122 B2 | 9/2020 | Oprins et al. | |
| 10,927,315 B2 | 2/2021 | Ramamurthy et al. | |
| 2002/0096451 A1 | 7/2002 | Ackerson et al. | |
| 2008/0194900 A1 | 8/2008 | Bhirud | |
| 2009/0107890 A1 | 4/2009 | Hamad et al. | |

(Continued)

FOREIGN PATENT DOCUMENTS

| | | |
|---|---|---|
| CA | 1246483 A | 12/1988 |
| CA | 2214305 A1 | 2/1999 |
| CN | 103571537 A | 2/2014 |
| CN | 106833719 A | 6/2017 |
| EP | 0697455 A2 | 2/1996 |
| EP | 3907267 A1 | 11/2021 |
| GB | 1248814 A | 10/1971 |
| GB | 1554767 A | 10/1979 |
| GB | 2040306 A | 8/1980 |
| JP | S4928642 B1 | 7/1974 |

(Continued)

OTHER PUBLICATIONS

Colorado School of Mines (Refinery Feedstocks & Products Properties & Specifications, Jul. 12, 2018. pp. 1, 2, and 21 (Year: 2018).*

(Continued)

*Primary Examiner* — In Suk C Bullock
*Assistant Examiner* — Alyssa L Cepluch
(74) *Attorney, Agent, or Firm* — SHELL USA, INC.

(57) ABSTRACT

The invention relates to a process for the recovery of aliphatic hydrocarbons from a liquid hydrocarbon feedstock stream comprising aliphatic hydrocarbons, heteroatom containing polar components and optionally aromatic hydrocarbons, said process comprising the steps of: a) mixing the liquid hydrocarbon feedstock stream with a solvent resulting in a liquid mixture; b) cooling the liquid mixture obtained in step a) to a temperature in the range of from +5° C. to −30° C. to obtain wax crystals in the mixture; c) separating wax crystals from the cooled liquid mixture obtained in step b) to produce a wax comprising aliphatic hydrocarbons and a dewaxed liquid mixture comprising solvent, heteroatom containing polar components and optionally aromatic hydrocarbons; d) separating solvent from the liquid mixture obtained in step c) and optionally recycling the separated solvent to step a). Further, the present invention relates to a process for the recovery of aliphatic hydrocarbons from plastics, and to a process for steam cracking a hydrocarbon feed.

8 Claims, No Drawings

(56)                    References Cited

U.S. PATENT DOCUMENTS

| | | |
|---|---|---|
| 2010/0300932 A1 | 12/2010 | Debuisschert et al. |
| 2011/0155645 A1 | 6/2011 | Serban et al. |
| 2013/0220884 A1 | 8/2013 | Bourane et al. |
| 2014/0005459 A1 | 1/2014 | Zhan et al. |
| 2016/0369184 A1 | 12/2016 | Ward et al. |
| 2018/0187087 A1 | 7/2018 | Atkins et al. |
| 2018/0355256 A1 | 12/2018 | Dooley |
| 2019/0062646 A1 | 2/2019 | Hakeem et al. |
| 2019/0161683 A1 | 5/2019 | Narayanaswamy et al. |
| 2020/0080009 A1 | 3/2020 | Derks |
| 2022/0135502 A1 | 5/2022 | Vongachariya et al. |

FOREIGN PATENT DOCUMENTS

| | | |
|---|---|---|
| WO | 0046322 A1 | 8/2000 |
| WO | 2010070029 A1 | 6/2010 |
| WO | 2013002887 A1 | 1/2013 |
| WO | 2017167948 A1 | 10/2017 |
| WO | 2018025104 A1 | 2/2018 |
| WO | 2021110395 A1 | 6/2021 |

OTHER PUBLICATIONS

Whitehurst Present State of the Art and Future Challenges in the Hydrodesulfurization . . . Advances in Catalysis, vol. 42, 1998, p. 345-471,ISSN 9780120078424, https://doi.org/10.1016/S0360-0564(08)60631-8. (https://www.sciencedirect.com/science/article/pii/S0360056408606318) (Year: 1998).*

International Search Report and Written Opinion received for PCT Patent Application No. PCT/US2020/043426, mailed on Aug. 28, 2020, 11 pages.

Office Action Received for Chinese Application No. 2020800289763, Mailed on Aug. 1, 2022, 20 Pages(11 Pages of English Translation and 09 Pages of Official Copy).

International Search Report and Written Opinion received for PCT Patent Application No. PCT/EP2020/084802, mailed on Mar. 10, 2021, 10 pages.

Siddiqui et al., "Pyrolysis of Mixed Plastics for the Recovery of Useful Products", Fuel Processing Technology, vol. 90, Issue No. 4, Apr. 2009, pp. 545-552.

Xianglin et al. "China Refining Technology", Jul. 31, 2001, pp. 327-328.

Office Action Received for Chinese Application No. 201780075338.5, mailed on Apr. 26, 2021, 16 pages (8 pages of English Translation and 8 pages of Official Copy).

Muhammad et al., "Catalytic Pyrolysis of Waste Plastic From Electrical and Electronic Equipment", Journal of Analytical and Applied Pyrolysis, vol. 113, May 2015, pp. 332-339.

Banerjee, "Thermal Processing of Hydrocarbons : Petroleum to Petrochemicals", 4.4.2 Furnace Design, 2019, 18 pages.

Li et al., "Analysis and Comparison of Nitrogen Compounds in Different Liquid Hydrocarbon Streams Derived From Petroleum and Coal" Energy & Fuels 2010, Apr. 10, 2010, pp. 5539-5547.

International Search Report and Written Opinion received for PCT Patent Application No. PCT/EP2017/081817 mailed on Feb. 19, 2018, 9 pages.

International Search Report and Written Opinion received for PCT Patent Application No. PCT/EP2020/060410, mailed on May 4, 2020, 09 pages.

Williams et al., "Fluidised Bed Pyrolysis of Low Density Polyethylene to Produce Petrochemical Feedstock", Journal of Analytical and Applied Pyrolysis, Jul. 1999, vol. 51, Issue No. 1-2, pp. 107-126.

Communication Pursuant to Rule 114(2) EPC Received for EP Application No. 20817002.7, Mailed on Jan. 5, 2023, 5 Pages.

* cited by examiner

RECOVERY OF ALIPHATIC HYDROCARBONS

CROSS REFERENCE TO RELATED APPLICATIONS

This is a National stage application of International application No PCT/EP2020/084802, filed Dec. 7, 2020, which claims priority of EP Application Serial No. 19214797.3, filed Dec. 10 2019 which is incorporated herein by reference in its entirety.

FIELD OF THE INVENTION

The present invention relates to a process for the recovery of aliphatic hydrocarbons from a liquid hydrocarbon feedstock stream; to a process for the recovery of aliphatic hydrocarbons from plastics; and to a process for steam cracking a hydrocarbon feed.

BACKGROUND OF THE INVENTION

Waste plastics can be converted via pyrolysis to high-value chemicals, including olefins and aromatic hydrocarbons. Pyrolysis of plastics can yield product streams having a wide boiling range, including gaseous and liquid product streams. Hydrocarbons from liquid pyrolysis product streams can be cracked to produce high-value chemicals, including ethylene and propylene which are monomers that can be used in making new plastics.

WO2018069794 discloses a process for producing olefins and aromatic hydrocarbons from plastics wherein a liquid pyrolysis product stream is separated into a first fraction having a boiling point<300° C. and a second fraction having a boiling point≥300° C. Only said first fraction is fed to a liquid steam cracker, whereas said second fraction is recycled to the pyrolysis unit. In the process shown in FIG. 1 of WO2018069794, said separation is performed in a hydrocarbon liquid distillation unit. Having to separate the liquid pyrolysis product stream into two fractions is cumbersome (e.g. energy intensive). A further disadvantage is that the heavier portion of the liquid pyrolysis product stream has to be sent back to the pyrolysis unit for a deeper pyrolysis. This results in yield loss through the formation of gas and an increasing amount of solid side-product (coke) which is eventually not sent to the steam cracker. In one embodiment of the process of above-mentioned WO2018069794 (see FIG. 2), the first fraction having a boiling point<300° C. is first conveyed together with hydrogen to a hydroprocessing unit to produce a treated hydrocarbon liquid stream which is then fed to the liquid steam cracker. Such hydroprocessing is also cumbersome, as it is capital intensive and requires the use of expensive hydrogen (H₂).

There is an ongoing need to develop improved processes for the recovery of aliphatic hydrocarbons from liquid streams comprising aliphatic hydrocarbons, heteroatom containing polar components and optionally aromatic hydrocarbons which liquid streams may originate from the pyrolysis of waste plastics, in specific mixed waste plastics.

It is an object of the present invention to provide such process for the recovery of aliphatic hydrocarbons from a liquid stream comprising aliphatic hydrocarbons, heteroatom containing polar components and optionally aromatic hydrocarbons, which is technically advantageous, efficient and affordable, in particular a process which does not have one or more of the above-mentioned disadvantages. Such technically advantageous process would preferably result in a relatively low energy demand and/or relatively low capital expenditure.

SUMMARY OF THE INVENTION

Surprisingly it was found that such process can be provided by subjecting a liquid hydrocarbon feedstock stream comprising aliphatic hydrocarbons and heteroatom containing polar components to solvent dewaxing, resulting in a wax comprising aliphatic hydrocarbons and a dewaxed liquid mixture comprising solvent and heteroatom containing polar components.

Accordingly, the present invention relates to a process for the recovery of aliphatic hydrocarbons from a liquid hydrocarbon feedstock stream comprising aliphatic hydrocarbons, heteroatom containing polar components and optionally aromatic hydrocarbons, said process comprising the steps of:

a) mixing the liquid hydrocarbon feedstock stream with a solvent resulting in a liquid mixture;

b) cooling the liquid mixture obtained in step a) to a temperature in the range of from +5° C. to −30° C. to obtain wax crystals in the mixture;

c) separating wax crystals from the cooled liquid mixture obtained in step b) to produce a wax comprising aliphatic hydrocarbons and a dewaxed liquid mixture comprising solvent, heteroatom containing polar components and optionally aromatic hydrocarbons;

d) separating solvent from the liquid mixture obtained in step c) and optionally recycling the separated solvent to step a).

Thus, in the present invention, heteroatom containing polar components are advantageously removed from an aliphatic hydrocarbon stream containing such polar components by the above-described solvent dewaxing process. This is advantageous as such heteroatom containing polar components may have adverse effects in further use of the aliphatic hydrocarbons, for example in a case where a heteroatom-containing aliphatic hydrocarbon stream is subjected to steam cracking. Oxygen containing compounds can result in a poor water oil separation, acids can impact the quench oil water pH, and aldehydes can result in the formation of so-called "green oil" (fouling) in the caustic section. Further, oxygen containing compounds can also promote the formation of radicals and initiate fouling by radical initiated polymerization. Nitrogen containing compounds could lead to formation of explosive $NO_x$ gums in the cold box. Amines can affect quench water pH and $NH_3$ can form deposits with chlorides. Further, nitrogen may end up in effluent residue which, when used as fuel, will produce $NO_x$. Chlorine containing compounds, when converted into chloride, can result in corrosion. Chloride is also a catalyst poison for any hydrotreating catalyst used in the backend. Further, chloride can form a deposit with ammonia. Metals (e.g. from salts) are known catalyst poisons and can also deposit in the preheater causing preheater fouling.

Further, advantageously, in the present invention heteroatom containing polar components can be removed by a solvent dewaxing process which is less cumbersome than a hydrotreatment process that is usually applied to remove heteroatoms. A hydrotreatment process is generally conducted in the presence of a hydrotreating catalyst at a relatively high temperature, suitably of from 250 to 400° C. Advantageously, such hydrotreatment necessary for removal of heteroatoms is completely obviated in the present process for the recovery of aliphatic hydrocarbons from a liquid hydrocarbon feedstock stream comprising aliphatic hydrocarbons and heteroatom containing polar components.

Further, since in the present process heteroatom containing polar components are easily removed by solvent dewaxing, the feed to the present process can advantageously tolerate a relatively high amount of such heteroatom containing polar components. Thus, waste plastic that may be pyrolyzed to produce a feed to the present solvent dewaxing process may comprise heteroatom-containing plastics, such as polyvinyl chloride (PVC), polyethylene terephthalate (PET) and polyurethane (PU). In specific, mixed waste plastic may be pyrolyzed that in addition to heteroatom-free plastics, such as polyethylene (PE) and polypropylene (PP), contains a relatively high amount of such heteroatom-containing plastics.

WO2017168165 discloses applying a solvent dewaxing process to remove undesired residual wax from a lubricant base stock as obtained in a process involving the thermal decomposition of plastic polyolefin polymer. This is illustrated in FIG. 2 of WO2017168165, wherein a stream (202) comprising substantially no heteroatoms is fed to a hydroisomerization reactor for carrying out step iv) of the process as claimed in WO2017168165. A stream (203) comprising a lubricant base stock exiting the hydroisomerization reactor is optionally fractionated before being fed into a solvent dewaxing unit where any undesired residual wax is removed. Thus, the feed to the solvent dewaxing process disclosed in WO2017168165 comprises substantially no heteroatoms.

Further, the present invention relates to a process for the recovery of aliphatic hydrocarbons from plastics, said process comprising the steps of:

i) converting the plastics by pyrolysis to a hydrocarbon product comprising a gas phase and a liquid phase;

ii) separating at least a portion of the hydrocarbon product into a hydrocarbon gas stream and a hydrocarbon liquid stream;

iii) subjecting at least a portion of the hydrocarbon liquid stream to the above-mentioned solvent dewaxing process.

Still further, the present invention relates to a process for steam cracking a hydrocarbon feed, wherein the hydrocarbon feed comprises aliphatic hydrocarbons recovered in any one of the above-mentioned processes.

DETAILED DESCRIPTION OF THE INVENTION

While the processes of the present invention and the stream(s) used in said processes are described in terms of "comprising", "containing" or "including" one or more various described steps and components, respectively, they can also "consist essentially of" or "consist of" said one or more various described steps and components, respectively.

In the context of the present invention, in a case where a stream comprises two or more components, these components are to be selected in an overall amount not to exceed 100%.

Further, where upper and lower limits are quoted for a property then a range of values defined by a combination of any of the upper limits with any of the lower limits is also implied.

Unless indicated otherwise, where in the present specification reference is made to a boiling point this means the boiling point at 760 mm Hg pressure.

In step a) of the present process, a liquid stream which comprises aliphatic hydrocarbons, heteroatom containing polar components and optionally aromatic hydrocarbons (also herein referred to as the "liquid hydrocarbon feedstock stream") is mixed with a solvent resulting in a liquid mixture. The liquid hydrocarbon feedstock may comprise a liquefied solid or wax that is heated to make it liquid.

Preferably, the liquid hydrocarbon feedstock stream comprises both aliphatic hydrocarbons having a boiling point of from 30 to 300° C. and aliphatic hydrocarbons having a boiling point of from greater than 300 to 600° C. in a weight ratio of from 99:1 to 1:99. The amount of aliphatic hydrocarbons having a boiling point of from 30 to 300° C., based on the total amount of aliphatic hydrocarbons having a boiling point of from 30 to 600° C., may be at most 99 wt. % or at most 80 wt. % or at most 60 wt. % or at most 40 wt. % or at most 30 wt. % or at most 20 wt. % or at most 10 wt. %. Further, the amount of aliphatic hydrocarbons having a boiling point of from 30 to 300° C., based on the total amount of aliphatic hydrocarbons having a boiling point of from 30 to 600° C., may be at least 1 wt. % or at least 5 wt. % or at least 10 wt. % or at least 20 wt. % or at least 30 wt. %.

Thus, advantageously, the liquid hydrocarbon feedstock stream may comprise varying amounts of aliphatic hydrocarbons within a wide boiling point range of from 30 to 600° C. Accordingly, as with the boiling point, the carbon number of the aliphatic hydrocarbons in the liquid hydrocarbon feedstock stream may also vary within a wide range, for example of from 5 to 50 carbon atoms. The carbon number of the aliphatic hydrocarbons in the liquid hydrocarbon feedstock stream may be at least 4 or at least 5 or at least 6 and may be at most 50 or at most 40 or at most 30 or at most 20.

The amount of aliphatic hydrocarbons in the liquid hydrocarbon feedstock stream, based on the total weight of the liquid hydrocarbon feedstock stream, may be at least 30 wt. % or at least 50 wt. % or at least 80 wt. % or at least 90 wt. % or at least 95 wt. % or at least 99 wt. % and may be smaller than 100 wt. % or at most 99 wt. % or at most 90 wt. % or at most 80 wt. % or at most 70 wt. %. The aliphatic hydrocarbons may be cyclic, linear and branched.

The aliphatic hydrocarbons in the liquid hydrocarbon feedstock stream may comprise non-olefinic (paraffinic) and olefinic aliphatic compounds. The amount of paraffinic aliphatic compounds in the liquid hydrocarbon feedstock stream, based on the total weight of the liquid hydrocarbon feedstock stream, may be at least 20 wt. % or at least 40 wt. % or at least 60 wt. % or at least 80 wt. % and may be smaller than 100 wt. % or at most 99 wt. % or at most 80 wt. % or at most 60 wt. %. Further, the amount of olefinic aliphatic compounds in the liquid hydrocarbon feedstock stream, based on the total weight of the liquid hydrocarbon feedstock stream, may be smaller than 100 wt. % or at least 20 wt. % or at least 40 wt. % or at least 60 wt. % or at least 80 wt. % and may be at most 99 wt. % or at most 80 wt. % or at most 60 wt. %.

Further, the olefinic compounds may comprise aliphatic compounds having one carbon-carbon double bond (mono-olefins) and/or aliphatic compounds having two or more carbon-carbon double bonds which latter compounds may be conjugated or non-conjugated. The aliphatic compounds having two or more carbon-carbon double bonds may include compounds having double bonds at alpha and omega positions. The amount of mono-olefins in the liquid hydrocarbon feedstock stream, based on the total weight of the liquid hydrocarbon feedstock stream, may be at least 20 wt. % or at least 40 wt. % or at least 60 wt. % or at least 80 wt. % and may be smaller than 100 wt. % or at most 99 wt. % or at most 80 wt. % or at most 60 wt. %. Further, the amount of conjugated aliphatic compounds having two or more carbon-carbon double bonds in the liquid hydrocarbon feedstock stream, based on the total weight of the liquid hydrocarbon feedstock stream, may be greater than 0 wt. % or at least 10 wt. % or at least 20 wt. % or at least 40 wt. % or at least 60 wt. % and may be at most 80 wt. % or at most 60 wt. % or at most 40 wt. %.

Within the present specification, an aliphatic hydrocarbon which contains one or more heteroatoms is a "heteroatom containing polar component" as further described below.

In addition to the above-described aliphatic hydrocarbons, the liquid hydrocarbon feedstock stream comprises heteroatom containing polar components and optionally aromatic hydrocarbons.

The amount of aromatic hydrocarbons in the liquid hydrocarbon feedstock stream, based on the total weight of the liquid hydrocarbon feedstock stream, may be 0 wt. % or greater than 0 wt. % or at least 5 wt. % or at least 10 wt. % or at least 15 wt. % or at least 20 wt. % or at least 25 wt. % or at least 30 wt. % and may be at most 50 wt. % or at most 40 wt. % or at most 30 wt. % or at most 20 wt. %. The aromatic hydrocarbons may comprise monocyclic and/or polycyclic aromatic hydrocarbons. An example of a monocyclic aromatic hydrocarbon is styrene. The polycyclic aromatic hydrocarbons may comprise non-fused and/or fused polycyclic aromatic hydrocarbons. An example of a non-fused polycyclic aromatic hydrocarbon is oligostyrene. Styrene and oligostyrene may originate from polystyrene. Examples of fused polycyclic aromatic hydrocarbons are naphthalene and anthracene. The aromatic ring or rings in the aromatic hydrocarbons may be substituted by one or more hydrocarbyl groups, including alkyl groups (saturated) and alkylene groups (unsaturated).

Within the present specification, an aromatic hydrocarbon which contains one or more heteroatoms is a "heteroatom containing polar component" as further described below.

Further, the amount of heteroatom containing polar components in the liquid hydrocarbon feedstock stream, based on the total weight of the liquid hydrocarbon feedstock stream, is greater than 0 wt. % and may be at least 0.5 wt. % or at least 1 wt. % or at least 3 wt. % or at least 5 wt. % or at least 10 wt. % or at least 15 wt. % or at least 20 wt. % and may be at most 30 wt. % or at most 20 wt. % or at most 10 wt. % or at most 5 wt. %.

The heteroatom containing polar components in the liquid hydrocarbon feedstock stream comprise heteroatom containing organic compounds. Additionally, the liquid hydrocarbon feedstock stream may comprise polar components comprising salts. The heteroatom containing organic compounds in the liquid hydrocarbon feedstock stream contain one or more heteroatoms, which may be oxygen, nitrogen, sulfur and/or a halogen, such as chlorine, suitably oxygen, nitrogen and/or a halogen. Preferably, said heteroatom containing organic compounds in the liquid hydrocarbon feedstock stream are synthetic compounds, and not natural compounds as present in for example fossil oil.

The above-mentioned salts may comprise organic and/or inorganic salts. The salts may comprise ammonium, an alkali metal, an alkaline earth metal or a transition metal as the cation and a carboxylate, sulphate, phosphate or a halide as the anion. The heteroatom containing organic compounds contain one or more heteroatoms, which may be oxygen, nitrogen, sulfur and/or a halogen, such as chlorine. The heteroatom containing organic compounds may comprise amines, amides, nitriles, ethers, esters and acids.

Further, the above-mentioned heteroatom containing organic compounds may be aliphatic or aromatic. An example of an aliphatic, heteroatom containing organic compound is oligomeric polyvinyl chloride (PVC). Oligomeric PVC may originate from polyvinyl chloride. Aromatic, heteroatom containing organic compounds may comprise monocyclic and/or polycyclic aromatic, heteroatom containing organic compounds. Examples of monocyclic aromatic, heteroatom containing organic compounds are terephthalic acid and benzoic acid. An example of a polycyclic aromatic, heteroatom containing organic compound is oligomeric polyethylene terephthalate (PET). Terephthalic acid, benzoic acid and oligomeric PET may originate from polyethylene terephthalate. Examples of nitrogen containing organic compounds are compounds originating from polyurethane and nylon.

In step a) of the present solvent dewaxing process, the liquid hydrocarbon feedstock stream is mixed with a solvent resulting in a liquid mixture. In solvent dewaxing, the liquid to be dewaxed is dissolved in a solvent and cooled to cause crystallization of the wax, which wax may subsequently be separated from the liquid. Suitable solvents for use in the present solvent dewaxing process are organic solvents, including but not limited to aliphatic hydrocarbons, aromatic hydrocarbons, ketones and any mixture thereof, preferably ketones. Suitable examples of said aliphatic hydrocarbons are liquefied propane and butane, pentane and hexane. Suitable examples of said aromatic hydrocarbons are benzene and toluene. Suitable examples of said ketones are acetone, methyl ethyl ketone and methyl isobutyl ketone. Preferably, a ketone is used as the solvent, more preferably methyl ethyl ketone, optionally in combination with another solvent, such an aliphatic or aromatic hydrocarbon as mentioned above, preferably toluene. A solvent, especially toluene, may also be used in step a) to keep the viscosity relatively low in the following step b) of the present solvent dewaxing process.

The weight ratio of liquid hydrocarbon feedstock stream to solvent in step a) of the present process may vary within wide ranges but is suitably of from 1:0.1 to 1:10, more suitably of from 1:0.5 to 1:5, even more suitably of from 1:1 to 1:3, most suitably of from 1:1 to 1:2.

In step b) of the present process, the liquid mixture obtained in step a) is cooled to a temperature in the range of from +5° C. to −30° C. to obtain wax crystals in the mixture. Preferably, in step b) the liquid mixture is cooled to a temperature in the range of from −10 to −30° C., more preferably −15 to −25° C. It is preferred that the liquid mixture is stirred during cooling.

In step c) of the present process, wax crystals are separated from the cooled liquid mixture obtained in step b) to produce a wax comprising aliphatic hydrocarbons and a dewaxed liquid mixture comprising solvent, heteroatom containing polar components and optionally aromatic hydrocarbons. Any separation method may be applied to achieve this. Suitably, filtration is applied.

Optionally, in the present process, the wax as produced in step c) may be washed with a solvent. Preferably, such solvent is the same as the solvent used in above-described step a). In such way, any residual heteroatom containing polar components may be removed from the wax. The weight ratio of (i) liquid hydrocarbon feedstock stream as fed to step a) of the present process to (ii) solvent used in said optional washing step may vary within wide ranges but is suitably of from 1:0.05 to 1:5, more suitably of from 1:0.1 to 1:2, even more suitably of from 1:0.2 to 1:1, most suitably of from 1:0.2 to 1:0.8.

In step d) of the present process, solvent is separated from the dewaxed liquid mixture comprising solvent, heteroatom containing polar components and optionally aromatic hydrocarbons obtained in step c). Any separation method may be applied to achieve this. Suitably, distillation is applied. Optionally, the separated solvent is recycled to step a). The remaining heteroatom containing polar components may be used for further processing. Further, in case the dewaxed liquid mixture obtained in step c) comprises solvent, heteroatom containing polar components and aromatic hydrocarbons, the latter mixture may be separated into a solvent stream which may be recycled to step a) and a stream comprising heteroatom containing polar components and aromatic hydrocarbons which latter stream may be further separated to recover aromatic hydrocarbons, wherein the remaining heteroatom containing polar components may be used for further processing.

In the present invention, the liquid hydrocarbon feedstock stream may comprise a liquid product produced by the pyrolysis of plastic waste, preferably mixed plastic waste. Such liquid product may be provided in any known way, for example by the process as disclosed in above-mentioned WO2018069794 or WO2017168165.

Further, the present invention relates to a process for the recovery of aliphatic hydrocarbons from plastics, said process comprising the steps of:

i) converting the plastics by pyrolysis to a hydrocarbon product comprising a gas phase and a liquid phase;

ii) separating at least a portion of the hydrocarbon product into a hydrocarbon gas stream and a hydrocarbon liquid stream;

iii) subjecting at least a portion of the hydrocarbon liquid stream to the above-described solvent dewaxing process.

The preferences and embodiments as described above with reference to the present solvent dewaxing process also apply to step iii) of the present process for the recovery of aliphatic hydrocarbons from plastics. In said step iii), a liquefied solid or wax that is heated to make it liquid, may also be subjected to the above-described solvent dewaxing process. Steps i) and ii) of the latter process may be carried out in any known way, for example in a way as disclosed in above-mentioned WO2018069794 and WO2017168165, the disclosures of which are herein incorporated by reference. For example, pyrolysis step i) may be carried out at subatmospheric pressure and a temperature of from 500 to 750° C.

Advantageously, aliphatic hydrocarbons from the wax comprising aliphatic hydrocarbons obtained in one of the above-described processes for the recovery of aliphatic hydrocarbons, which may comprise varying amounts of aliphatic hydrocarbons within a wide boiling point range, may be fed to a steam cracker without a further pretreatment, such as treatment with hydrogen (hydrotreating or hydroprocessing) as disclosed in above-mentioned WO2018069794. In addition to being used as a feed to a steam cracker, said recovered aliphatic hydrocarbons may also advantageously be separated into different fractions which each may find a different application, such as diesel, marine fuel, solvent, etc.

Accordingly, the present invention also relates to a process for steam cracking a hydrocarbon feed, wherein the hydrocarbon feed comprises aliphatic hydrocarbons from the wax comprising aliphatic hydrocarbons obtained in one of the above-described processes for the recovery of aliphatic hydrocarbons. Further, accordingly, the present invention also relates to a process for steam cracking a hydrocarbon feed, comprising the steps of: obtaining a wax comprising aliphatic hydrocarbons from a liquid hydrocarbon feedstock stream in one of the above-described processes for the recovery of aliphatic hydrocarbons; and steam cracking a hydrocarbon feed, wherein the hydrocarbon feed comprises aliphatic hydrocarbons from the wax obtained in the preceding step. The hydrocarbon feed to the steam cracking process may also comprise hydrocarbons from another source, other than the present process for the recovery of aliphatic hydrocarbons from a liquid hydrocarbon feedstock stream. Such other source may be naphtha, hydrowax or a combination thereof.

Advantageously, in a case wherein the liquid hydrocarbon feedstock stream comprises aromatic hydrocarbons, especially polycyclic aromatics, heteroatom containing polar components, conjugated aliphatic compounds having two or more carbon-carbon double bonds, or a combination thereof, these have already been removed by the present solvent dewaxing process as described above before feeding recovered hydrocarbons to a steam cracking process. This is particularly advantageous in that said removed compounds and components, especially polycyclic aromatics, can no longer cause fouling in the preheat, convection and radiant sections of a steam cracker and in the downstream heat exchange and/or separation equipment for a steam cracker, for example in transfer line exchangers (TLEs) which are used to rapidly cool the effluent from a steam cracker. When hydrocarbons condense, they may thermally decompose into a coke layer which may cause fouling. Such fouling is a major factor determining the run length of the cracker. Reducing the amount of fouling results in longer run times without maintenance shutdowns, and improved heat transfer in the exchangers.

The steam cracking may be performed in any known way. The hydrocarbon feed is typically preheated. The feed can be heated using heat exchangers, a furnace or any other combination of heat transfer and/or heating devices. The feed is steam cracked in a cracking zone under cracking conditions to produce at least olefins (including ethylene) and hydrogen. The cracking zone may comprise any cracking system known in the art that is suitable for cracking the feed. The cracking zone may comprise one or more furnaces, each dedicated for a specific feed or fraction of the feed.

The cracking is performed at elevated temperatures, preferably in the range of from 650 to 1000° C., more preferably of from 700 to 900° C., most preferably of from 750 to 850° C. Steam is usually added to the cracking zone, acting as a diluent to reduce the hydrocarbon partial pressure and thereby enhance the olefin yield. Steam also reduces the formation and deposition of carbonaceous material or coke in the cracking zone. The cracking occurs in the absence of oxygen. The residence time at the cracking conditions is very short, typically on the order of milliseconds.

From the cracker, a cracker effluent is obtained that may comprise aromatics (as produced in the steam cracking process), olefins, hydrogen, water, carbon dioxide and other hydrocarbon compounds. The specific products obtained depend on the composition of the feed, the hydrocarbon-to-steam ratio, and the cracking temperature and furnace residence time. The cracked products from the steam cracker are then passed through one or more heat exchangers, often referred to as TLEs ("transfer line exchangers"), to rapidly reduce the temperature of the cracked products. The TLEs preferably cool the cracked products to a temperature in the range of from 400 to 550° C.

The invention is further illustrated by the following Examples.

EXAMPLES 120 grams of an oil produced by the pyrolysis of plastic waste (hereinafter "pyrolysis oil") was dissolved in 180 grams of methyl ethyl ketone (MEK) at room temperature while stirring. The resulting solution was then cooled to a temperature of –20° C. at a rate of 1° C. per minute and held at that temperature for 20 minutes while stirring. The formed wax crystals were then filtered off under a slight vacuum pressure. The resulting wax cake was then washed one time with 60 grams of MEK. The amount of recovered wax was 10.5 grams, which is 8.8 wt. % based on the total amount of pyrolysis oil used.

Advantageously, as shown in Table 1 below, the wax cake obtained in the above experiment by applying the solvent dewaxing process of the present invention, contained a substantially reduced amount of heteroatoms (O, S, N, Cl). Furthermore, the decrease in the C/H ratio indicates that said wax cake also contained a substantially reduced amount of saturated compounds.

TABLE 1

|  | Pyrolysis oil | Wax |
|---|---|---|
| Carbon + hydrogen (C/H content; wt. %) | 99.4 | >99.9 |
| C/H ratio | 6.4 | 2.1 |
| Oxygen (O; wt. %) | 0.2 | <0.1[(1)] |
| Sulphur (S; ppmw) | 288 | 12 |
| Nitrogen (N; ppmw) | 319 | 12 |
| Chlorine (Cl; ppmw) | 810 | 10 |

[(1)]Since the C/H content was increased from 99.4 to >99.9 wt. %, the oxygen content was decreased to <0.1 wt. %. The detection limit for the oxygen analysis method applied to the wax was 0.3 wt. %.

I claim:

1. Process for recovery of aliphatic hydrocarbons from a liquid hydrocarbon feedstock stream, said process comprising the steps of:
   a) pyrolyzing plastics to produce a hydrocarbon product comprising a liquid hydrocarbon feedstock stream;
   b) mixing at least a portion of the liquid hydrocarbon feedstock stream with a solvent to dissolve the liquid hydrocarbon feedstock stream in the solvent and produce;
   c) cooling the liquid mixture obtained in step b) to a temperature in a range of +5° C. to –30° C. to obtain wax crystals in the liquid mixture;

d) separating the wax crystals from the cooled liquid mixture obtained in step c) to produce a wax comprising aliphatic hydrocarbons and a dewaxed liquid mixture comprising the solvent, heteroatom containing polar components and aromatic hydrocarbons, wherein the wax comprising aliphatic hydrocarbons comprises a carbon+hydrogen C/H content of >99.9 wt % and oxygen content of <0.1 wt %; and
   e) separating the solvent from the dewaxed liquid mixture obtained in step d) and optionally recycling the separated solvent to step b),
      wherein the liquid hydrocarbon feedstock stream comprises aliphatic hydrocarbons, at least 0.5 wt. % of heteroatom containing polar components, and at least 5 wt. % of aromatic hydrocarbons, and
      wherein the heteroatom containing polar components comprise synthetic heteroatom containing organic compounds.

2. Process according to claim 1, wherein a weight ratio of aliphatic hydrocarbons having a boiling point of from 30 to 300° C. to aliphatic hydrocarbons having a boiling point of from greater than 300 to 600° C. in the liquid hydrocarbon feedstock stream is from 99:1 to 1:99.

3. Process according to claim 1, wherein the solvent is an organic solvent.

4. Process according to claim 3, wherein the organic solvent is an aliphatic hydrocarbon, an aromatic hydrocarbon, a ketone or any mixture thereof.

5. Process according to claim 1, wherein a weight ratio of liquid hydrocarbon feedstock stream to solvent in step b) is from 1:0.1 to 1:10.

6. Process according to claim 1, wherein in step c) the liquid mixture is cooled to a temperature in a range of –10 to –30° C.

7. Process according to claim 1, further comprising prior to step b):
   separating at least a portion of the hydrocarbon product to produce a gas stream and the liquid hydrocarbon feedstock stream.

8. Process according to claim 1, further comprising:
   steam cracking aliphatic hydrocarbons from the wax obtained in step d).

* * * * *